United States Patent [19]

Kowalski

[11] Patent Number: 5,361,630
[45] Date of Patent: Nov. 8, 1994

[54] IGNITION SYSTEM SENSOR

[75] Inventor: James E. Kowalski, Sterling Heights, Mich.

[73] Assignee: Chrysler Corporation, Highland Park, Mich.

[21] Appl. No.: 103,304

[22] Filed: Aug. 5, 1993

Related U.S. Application Data

[63] Continuation of Ser. No. 790,036, Nov. 12, 1991, abandoned.

[51] Int. Cl.$^5$ .......................................... G01M 15/00
[52] U.S. Cl. ................................. 73/117.3; 324/207.25
[58] Field of Search ........................... 73/116, 117.3; 324/207.2, 207.22, 207.25, 160, 166, 167, 173, 174, 178, 179; 123/612, 613, 617

[56] References Cited

U.S. PATENT DOCUMENTS

| | | |
|---|---|---|
| 4,155,340 | 5/1979 | Fernquist et al. |
| 4,235,101 | 11/1980 | Stadelmann ............... 73/116 |
| 4,558,591 | 12/1985 | Francis et al. ............ 73/116 |
| 4,713,965 | 12/1987 | Kobayashi ............... 73/119 A |
| 4,914,387 | 4/1990 | Santos ..................... 324/166 |
| 4,924,830 | 5/1990 | Abe ......................... 73/117.3 |
| 5,097,209 | 3/1992 | Santos ................... 324/207.25 |
| 5,119,670 | 6/1992 | Whitehorn et al. ........ 73/116 |

FOREIGN PATENT DOCUMENTS

| | | |
|---|---|---|
| WO88/07172 | 9/1988 | Germany . |
| WO91/10113 | 7/1991 | Germany . |
| 0006316 | 1/1982 | Japan ................ 324/207.25 |
| 2217852A | 1/1989 | United Kingdom . |

OTHER PUBLICATIONS

Clark, "Rotary Tachometer/Encoder", IBM Technical Bulletin, vol. 18, No. 9, Feb. 1976.

Primary Examiner—Robert Raevis
Attorney, Agent, or Firm—Mark P. Calcaterra

[57] ABSTRACT

Disclosed is a direct ignition system for an internal combustion engine incorporating a first magnetic sensor for determining the crank shaft position and a second magnetic sensor for determining the cam shaft position. A counter weight integral with the crank shaft includes two patterns of four slots each representative of the speed and position of two of four pistons, respectively. One of the slots of one of the patterns of slots is substantially wider than the remaining slots and as such represents a signature slot. The first magnetic sensor sends a signal to an onboard computer representative of the slot patterns as the crank shaft rotates. The cam shaft includes a magnet at one of its ends opposite the cam sprocket. The magnet includes a plurality of alternating pole sections in which predetermined areas of the pole sections differ in size. The second magnetic sensor is positioned adjacent the magnet such that it sends a signal indicative of a change from one pole to an adjacent pole of the magnet. By arranging the magnetic poles and the slots in an appropriate configuration, a timing diagram representative of the first and second magnetic sensor signals can be compared. By this, a single position on the timing diagram can be determined to isolate the position and speed of a particular piston and determine if it is in an exhaust or firing stroke. Therefore, engine position can be determined within one revolution of the crank shaft.

22 Claims, 2 Drawing Sheets

IGNITION SYSTEM SENSOR

This is a continuation of U.S. patent application Ser. No. 07/790,036, filed Nov. 12, 1991, now abandoned.

BACKGROUND OF THE INVENTION

1. Field of the Invention

This invention relates generally to an ignition system for an internal combustion engine, and more specifically, to a direct ignition system for an internal combustion engine incorporating magnetic sensors for sensing cam and crank shaft positions.

2. Background and Summary of the Invention

In an internal combustion engine, it is a requirement that means be included to synchronize both the injection of fuel, ignition firing and exhaustion of each of the cylinders of the engine. Conventional internal combustion engines generally utilize a distributor to perform this operation. Many modern internal combustion engines, however, incorporate distributorless ignition systems sometimes referred to as direct ignition systems (DIS). In a DIS, magnetic sensors are generally incorporated to detect the engine position, i.e., the piston stroke and speed for each cylinder, by sensing the rotation of the crank and cam shafts, and thus, to determine which cylinders are to receive fuel, ignition firing, etc. These sensors combined with an onboard computer provide an intricate and reliable method for determining engine position and have greatly improved control of fuel injection and ignition firing over the conventional distributor. Other advantages of distributorless ignition systems include reduction of spark scatter caused by certain mechanical components of the ignition system.

It is known in the art to include a magnetic position sensor in conjunction with the engine's flywheel to sense crank shaft position. It is further known to include a magnetic position sensor in conjunction with the cam sprocket of the cam shaft to sense cam shaft position. The signals associated with the crank and cam shaft positions can then be deciphered to determine the appropriate sequence of fuel injection, ignition firing and exhaustion to each of the cylinders. Typically, in these prior art systems the flywheel will include a specially configured array of markings whose positions can be detected by the magnetic sensor. Further, the cam sprocket will also include a predetermined configuration of markings also detectable by the other magnetic sensor. Consequently, the flywheel and cam sprocket require additional customized components over the conventional flywheel and cam sprocket to accommodate the markings.

Because of the nature of the detection of the markings on these components, certain rigorous tooling procedures are required providing intense accuracy and precision. The complexity of these components demands extensive lead time and further reduces flexibility. Other precision requirements include tight tolerances of the air gap between the magnetic sensors and the customized components. For example, since the magnetic sensor associated with the crank shaft is generally positioned within a housing and is connected to the transmission, the magnetic sensor is mounted to the housing by means of a movable support such that the position between the magnetic sensor and the crank shaft is adjustable. Although these prior art systems have operated successfully, the rigid tolerances and added components of the prior art systems add an undesirable cost and weight to the finished product.

Once the system described above is accurately assembled and in operation, it still suffers from a number of undesirable characteristics. Specifically, the system requires the crank and cam shafts go through a minimum rotational speed to provide a proper signal to the onboard computer before the computer authorizes a "first fire" of the first cylinder. Because of this, the computer must wait for some period after the engine operator first initiates start-up of the engine before the computer can synchronize the proper sequence of fuel injection and ignition firing. This provides a certain drain on the battery which may ultimately effect engine start-up during such times as in cold weather.

What is needed then is a direct ignition system incorporating sensing of the cam shaft and crank shaft position, but which does not include added high precision components, and further, which does not incorporate a delay of the "first fire" of the first cylinder during engine start-up. It is therefore an object of the present invention to provide such a method and apparatus.

Disclosed is a direct ignition system for use with an internal combustion engine. In one preferred embodiment, a magnetic sensor, typically a solid state hall effect switch, is positioned relative to a specific counter weight integral with the crank shaft. The counter weight is comprised of a magnetic material having specific patterns of grooves or slots spaced apart from each other in a predetermined arrangement. One of the grooves is a signature groove which is generally of a substantially wider dimension than the remaining grooves. The patterns of grooves are separated into specific sets representing the stroke position and speed of a particular set of pistons operating in unison. As the counter weight including the detection grooves rotates relative to the hall switch, the magnetic field of a magnet within the hall switch will be decreased as each groove passes in front of the sensor. The last groove of a groove set indicates at what point the set of pistons representative of that group is at top dead center, i.e., when the pistons are completely inserted within their respective cylinders.

The cam shaft also includes a magnetic sensor, also typically a solid state hall effect switch. In contrast to the magnetic sensor associated with the crank shaft, the magnet of the cam shaft magnetic sensor is generally not included within the hall switch, but is positioned at an end of the cam shaft opposite the cam sprocket. The magnet typically includes an array of alternating north and south poles. In general, the poles of the magnet are arranged in a specific keyed pattern relative to the lobes controlling the valve positions such that sections of specific poles are of different areas relative to other sections of poles. The hall switch itself is rigidly connected to the cylinder head of the engine block. Since the magnetic sensor is attached adjacent to the end of the cam shaft, it can also act as a thrust plate to control cam shaft play within the cylinder head. By this configuration, the hall switch can determine whether a particular cylinder is in a compression or exhaust stroke.

As is well known, the cam shaft turns at one revolution per every two revolutions of the crank shaft. As the cam shaft rotates the hall switch produces an output pattern in which the signal goes from low to high or high to low during a transition between two adjacent poles. In addition, the output of the hall switch adjacent the crank shaft counter weight goes from low to high and high to low as each groove passes by the sensor while the crank shaft is rotating. Since the output pattern of the hall switch adjacent the crank shaft gives output information concerning which set of pistons is at what location, as well as the speed at which they are moving, and the cam shaft hall switch gives compression and exhaust information of specific cylinders, the onboard computer can determine which cylinder of the set of cylinders would be in an exhaustion sequence and which one is in a compression sequence requiring fuel injection for firing. Only once during a cam shaft revolution would the transition go from "high" to "low" during detection of the crank shaft signature slot. Any other transition from "high" to "low" occurs when the crank signal is low. Therefore, the onboard computer can determine within one revolution of the crank shaft which cylinder requires firing.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments is merely exemplary in nature and is in no way intended to limit the invention or its application or uses.

Disclosed is a method and apparatus for providing engine position to an onboard computer in an internal combustion engine in order to facilitate proper timing of each cylinder of the engine. The description given below is with respect to a four cylinder, 2.0 liter internal combustion engine; however, it will be understood that the same principles can apply to other sized internal combustion engines having different numbers of cylinders.

Figure 1:
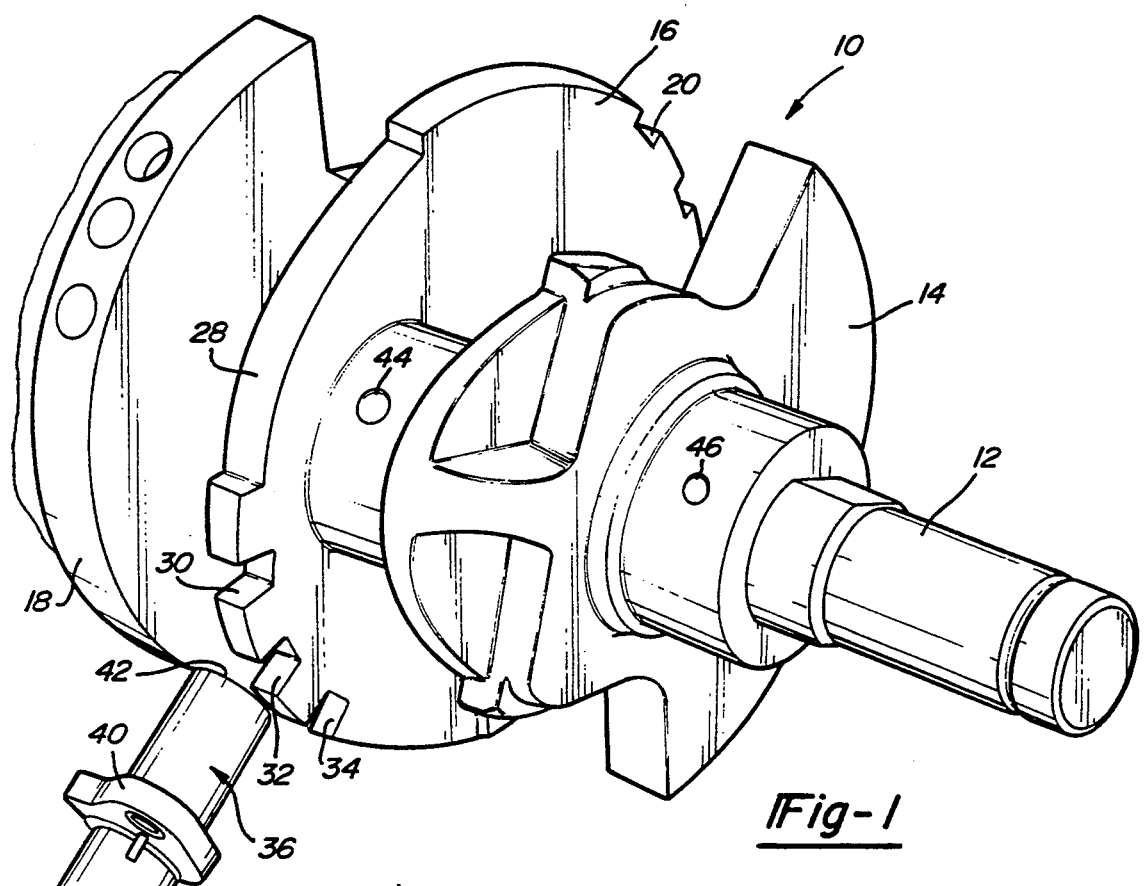
FIG. 1 is a perspective view of a crank shaft incorporating a detection counter weight and an accompanying magnetic sensor.

Now turning to FIG. 1, a portion of a crank shaft assembly 10, according to a preferred embodiment of the present invention, is shown in a cut-away perspective view. Crank shaft assembly 10 includes a crank shaft 12 supporting a number of counter weights 14, 16 and 18. Counter weights 14, 16 and 18 act as balancing weights to offset the load that each of the motions of the pistons places on the crank shaft, and thus stabilize the rotation of the crank shaft. A bearing journal 46 acts as a main bearing support for facilitating rotation of crank shaft 12. Positioned opposite counter weight 14 from main bearing journal 46 is a piston or rod bearing journal 44. Journal 44 is offset from the axis of shaft 12 and serves as an interconnection between crank shaft 12 and an appropriate piston (not shown) of an internal combustion engine by means well known to those skilled in the art. Opposite bearing journal 44 on the opposite side of counter weight 16 is a second main bearing journal (not shown). The sequence of main bearings journals and piston bearings journals along shaft 12 is continued until the appropriate number of piston bearings journals is achieved. Each piston bearing journal is offset from the axis of shaft 12 in the appropriate configuration as is well known in the art. Consequently, as shaft 12 rotates the pistons are moved in and out of their appropriate cylinders. It is noted that generally for a four cylinder engine two sets of two pistons will be moving in unison. Therefore, a second piston bearing journal is in substantially the same position as bearing journal 44 with respect to the axis of shaft 12.

Counter weight 16 also acts as a detection counter weight and as such includes a number of sensing slots. Consequently, counter weight 16 is not an added component to the crank shaft assembly 10 in order to achieve the results of this invention. Counter weight 16 includes eight sensing slots in two groups of four slots each. Four sensing slots 20, 22, 24 and 26 represent a first group of sensing slots and are positioned on one section of counter weight 16 in an appropriately configured pattern as shown. In FIG. 1, sensing slots 20 and 22 are shown and sensing slots 24 and 26 are hidden by counter weight 14. Substantially opposite the first group of sensing slots is a second group of four sensing slots 28, 30, 32 and 34 in an appropriately configured pattern. In the second group of four sensing slots, sensing slot 28 is of a much wider dimension than the remaining seven sensing slots, and is typically referred to as a signature slot as will be described hereunder.

Positioned adjacent counter weight 16 is a magnetic sensor 36, typically a hall effect switch well known to those skilled in the art. Hall effect switch 36 is positioned relative to counter weight 16 such that it can detect a sensing slot as it passes by a front face 42 of switch 36. Generally, hall effect switch 36 will include a magnet within its housing, along with appropriate integrated circuitry, for detecting changes in magnetic field strength. These changes in magnetic field strength are registered as electrical signals which are transferred to an onboard computer (not shown) along electrical line 38. Crank shaft assembly 10 will be rotationally supported by the main bearings journals 46 on the bottom of the cylinder block and enclosed by an oil pan housing also secured to the bottom of the cylinder block incorporating the cylinders and pistons. Preferably, hall effect switch 36 is rigidly connected to either the cylinder block or oil pan housing by means of a supporting device such as support member 40 encircling sensor 36. Since counter weight 16 is an integral part of crank shaft assembly 10 precision machining of additional components is not necessary. Further, since hall switch 36 merely detects changes in magnetic flux associated with a passing sensor slot, the accuracy of the air gap between counter weight 16 and the face 42 of sensor 36 is not crucial and therefore, magnetic sensor 36 need not be adjusted to alter the air gap after it has been rigidly affixed to the crank shaft housing.

Figure 2:
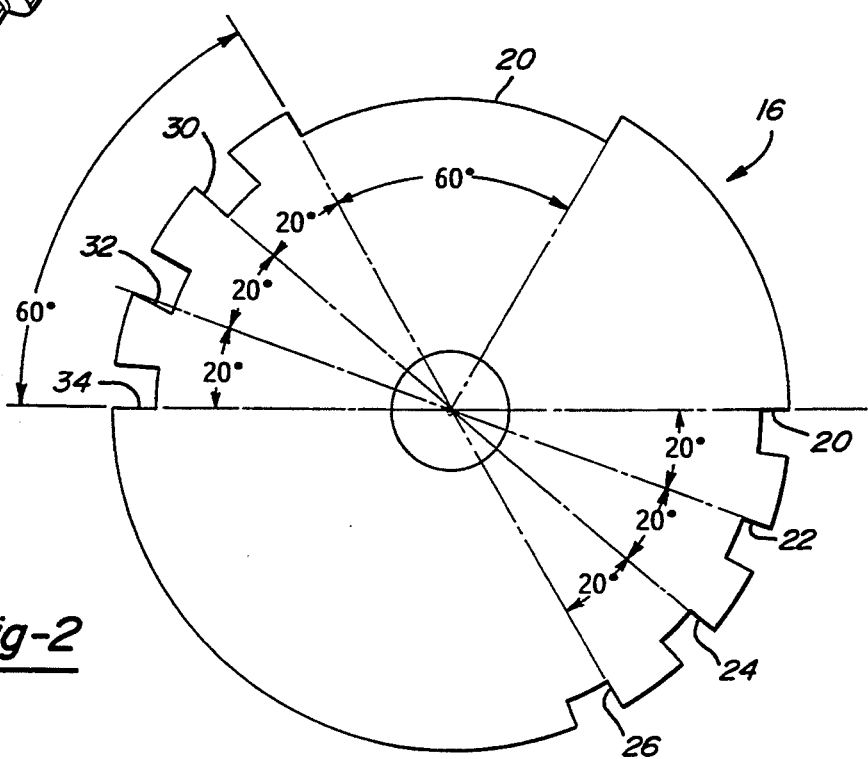
FIG. 2 is a schematic drawing of the detection counter weight of the crank shaft of FIG. 1.

FIG. 2 shows a schematic side view of counter weight 16. As is apparent, sensor slots 20, 22, 24 and 26 are configured on one side of counter weight 16 and take up approximately 70° of the circle of counter weight 16. Opposite that group of sensor slots are sensor slots 28, 30, 32 and 34. Sensor slots 30, 32 and 34 take up about 60° of the circle of counter weight 16 and signature slot 28 also takes up approximately 60° of counter weight 16. For the specific embodiment disclosed, each of the smaller slots, 20, 22, 24, 26, 30, 32 and 34 are approximately 10.23 millimeters wide and 5.1 millimeters deep. Signature slot 28 is approximately 79.56 millimeters wide and 5.1 millimeters deep. It will be understood that other dimensions and configurations can be included without departing from the spirit and scope of the invention.

In operation, as shaft 12 rotates, counter weights 14, 16 and 18 also rotate, and each of the pistons are moved in and out of their respective cylinders. As counter weight 16 rotates, each of the sensor slots pass in front of magnetic sensor 36. Because counter weight 16 is comprised of a magnetic material, such as steel, the magnetic flux lines from the magnet within magnetic sensor 36 are altered depending on the distance between the magnetic sensor 36 and the material of counter weight 16. In other words, magnetic sensor 36 will register one magnetic reading when no slot is present in front of it and will register a substantially different reading when a slot does pass in front of it. Therefore, a signal is transferred along line 38 representative of either a low signal, i.e., no slot, or a high signal, i.e., when a slot is present. Magnetic sensor 36 can also be designed to register a low signal when no slot is present and a high signal when a slot is present. Consequently, a pattern of high and low signals transferred to the onboard computer can be ascertained. Since counter weight 16 is stationary relative to the remaining counter weights on shaft 12, the position of counter weight 16 represents the position of the remaining counter weights and further the position of the respective pistons within the cylinders. It is necessary to have only two groups of slots since, as discussed above, two of the four cylinders are moving in unison as are the remaining two cylinders. Slot 28 is a signature slot and as such distinguishes the first slot group comprised of slots 28, 30, 32 and 34 from the second slot group of slots 20, 22, 24 and 26. Therefore, the computer can distinguish between the two groups of cylinders.

Looking at FIG. 2, counter weight 16 will be rotating in a clockwise direction. As counter weight 16 rotates, signature slot 28 will eventually pass before magnetic sensor 36. As it passes in front of magnetic sensor 36, the sensor will register a change in the magnetic field and indicate along line 38 to the onboard computer that the signature slot 28 is passing before it. The computer will then decipher the signal as evidence that the pistons of one group of cylinders, such as cylinders one and four are on an upward stroke. The magnetic sensor will then register a signal from sensor slot 30 and then a signal from sensor slot 32. As each slot passes before magnetic sensor 36, the onboard computer will also be able to generate an angular speed signal of how fast the crank shaft is rotating. Therefore, the computer will know at what time to apply a signal to the spark plug in order to fire the cylinder which is in compression. The point of firing the spark plug generally comes at, or slightly before top dead center, (i.e., when maximum compression is achieved) depending upon the speed of the engine. This point is representative for the first group of slots at approximately the second edge of slot 34. The same is true for the second group of slots. In that group, slot 26 will be the first slot to engage the magnetic sensor 36. Since it is of regular size, i.e., not a signature slot, the onboard computer will know that it is the second set of cylinders, generally cylinders two and three. Once again, the computer will be able to tell the angular speed of shaft 12 by the speed in which slots 24 and 22 pass in front of magnetic sensor 36. And, once again, it will know when the pistons are at top dead center as representative by the second edge of slot 20.

By the arrangement of the slots on counter weight 16, it is apparent that the onboard computer will be able to determine the angular speed of shaft 12 as well as the position of one group of two pistons within their cylinders. However, since only one of the four cylinders is fired at a time, i.e., the spark plug is ignited, it is necessary to further determine which one of the two cylinders representative of the group of slots passing before magnetic sensor 36 is to be fired. Further means, as will be described below, are included to separate these two cylinders.

Figure 3:
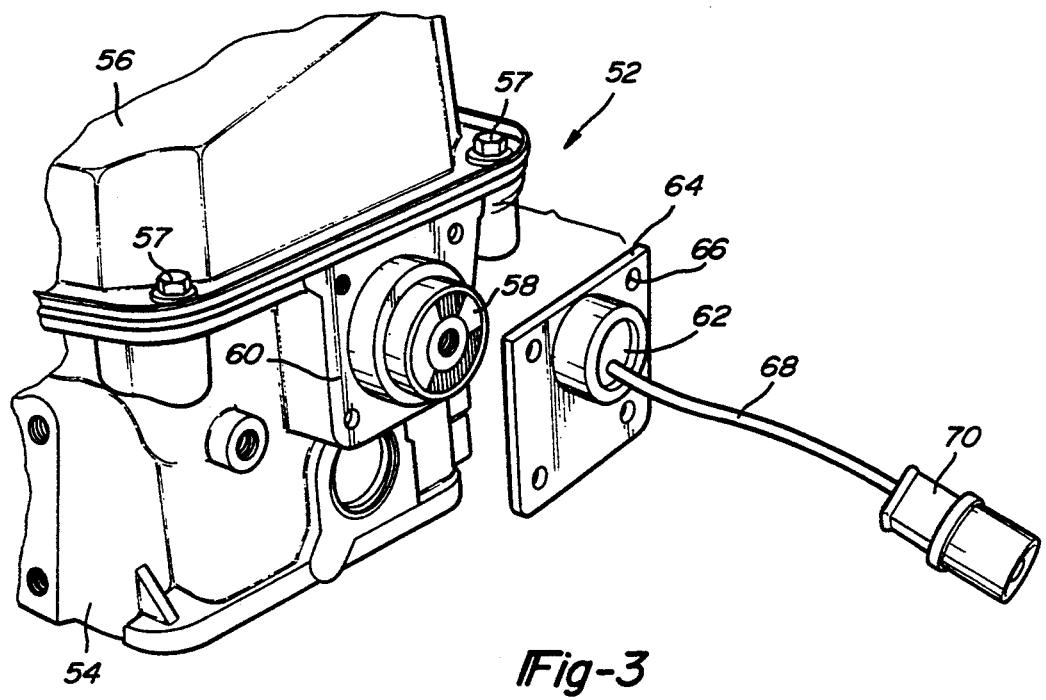
FIG. 3 is an exploded perspective view of a cylinder head and a magnetic sensor.

Now turning to FIG. 3, a cam block assembly 52 is shown in a cut-away perspective view such that only one end of the assembly is shown. Cam block assembly 52 includes a cylinder head 54 and a valve cover 56. Valve cover 56 is rigidly affixed to cylinder head 54 by means of bolts 57 as is well known in the art. A cam shaft 72 (see FIG. 4) is enclosed within assembly 52 as is also well known in the art. At one end of cam shaft 72 is a disk magnet 58. Disk magnet 58 is generally connected to cam shaft 72 at an end opposite to the cam sprocket (not shown). Disk magnet 58 is shown in FIG. 3 protruding slightly from cylinder head 54 for clarity. In addition, a thrust plate 64 is shown separated from cylinder head 54. Generally, the outer surface of disk magnet 58 will be substantially flush against surface 60 of cylinder head 54 such that thrust plate 64 is flush with surface 60 and rigidly secured there by bolts extending through bolt holes 66 of thrust plate 64. In this configuration, cam shaft 72 is maintained in axial alignment within assembly 52.

In a preferred embodiment of the present invention, a hall effect switch 62 is included within thrust plate 64. In the prior art hall switches, a magnet is generally positioned within the housing of the sensor, as was discussed above for the crank shaft magnetic sensor 36. In a preferred embodiment of the present invention, however, magnet 58 is rigidly affixed to the end of cam shaft 72 such that as it rotates with cam shaft 72, hall switch 62 can detect the changes in polarity as the different poles pass in front of it. The change in polarity is representative as a change in the high or low signal along output line 68 from magnetic sensor 62 and is sent to the onboard computer by means of connector 70.

Figure 4:
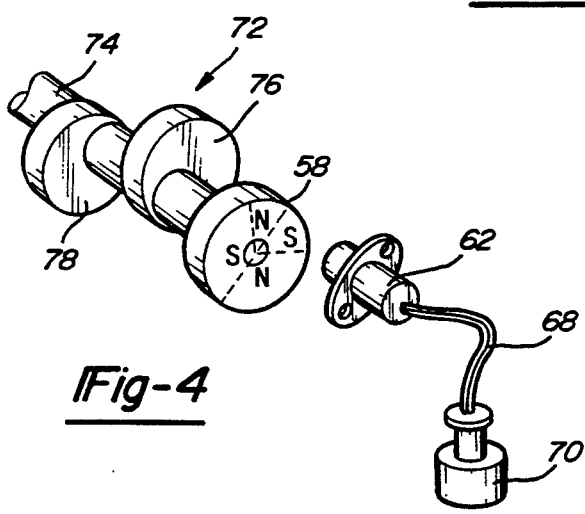
FIG. 4 is a perspective view of the cam shaft and the magnetic sensor of FIG. 3.

FIG. 4 shows a cut-away perspective view of cam shaft 72 separate from assembly 52. Here, cam shaft 72 includes cam shaft lobes 76 and 78 which are operable to actuate the valves of each one of the cylinders. Additional lobes (not shown) will be connected to the remaining valves in the appropriate configuration. As is apparent, as shaft 72 rotates, lobes 76 and 78 will turn accordingly, and thus, open or close the respective associated valves. Also shown is magnet 58 positioned at one end of cam shaft 72. Each of the sections of magnet 58 are labeled north or south according to their appropriate polarity, and further, it can be seen that the poles are in an alternating configuration. In addition, the sizes of each of the poles are configured in an asymmetric pattern. The reason for this will become apparent following the discussion below.

In operation, as cam sprocket 72 is rotated the cam shaft will turn and the valves will be opened and closed accordingly. As is well known in the art, the opening and closing of the valves enables the fuel-air mixture to be introduced to the cylinders and the cylinders to be exhausted after firing. As a transition between a north and a south pole or a south and a north pole passes before magnetic sensor 62, a signal will be sent along line 68 as an indication of the pole change. Generally, the strength of magnet 58 need not be great because the hall switch only detects a change of magnetic gauss as the polarity changes from positive to negative or vice-versa. Accordingly, the magnet need only be in close proximity to the sensor. Since the magnetic poles are keyed relative to the positions of lobes 76 and 78, as well as the remaining valve lobes, the onboard computer will be able to decipher which valves are being opened and which valves are being closed.

Figure 5:
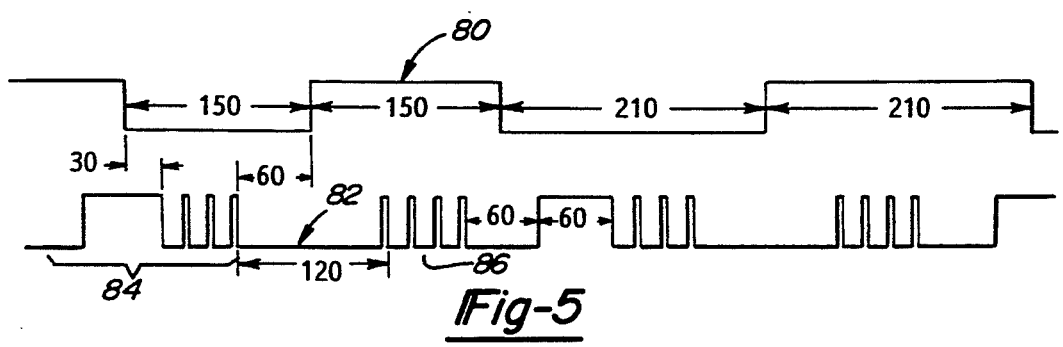
FIG. 5 is a signal diagram of the crank shaft sensor of FIG. 1 and the cam shaft sensor of FIG. 3.

FIG. 5 represents a signal diagram of the two magnetic sensors 36 and 62 in crank shaft degrees. Signal diagram 80 represents the cam shaft signal as transitions between highs and lows as different polarities of the magnet pass before magnetic sensor 62. A first low signal extends over 150° of crank shaft rotation, a first high signal extends over 150° of crank shaft rotation, a second low signal extends over 210° of crank shaft rotation, and a second high signal extends over 210° of crank shaft rotation. The addition of all of these degrees equals 720° or twice that of a circle. This is because as the cam shaft rotates one complete turn, the crank shaft has rotated two complete turns. Therefore, since the diagram of FIG. 5 is in crank shaft degrees, each of the cam shaft degrees is doubled.

Signal line 82 represents the signal diagram from magnetic sensor 36. The group of signals 84 represents the signals of the first group of sensors on counter weight 16. In this signal diagram, a high signal is representative of a slot passing magnetic sensor 36. It is possible that a low signal could be representative of the slot passing the sensor. The second edge of the last slot of the group represents the top dead center point of the piston within the cylinder. The second group 86 of sensor signals is comprised of four slot signals as discussed above, also including a top dead center representation. The configuration of signal diagrams 80 and 82 provide diagrams which enable the onboard computer to compare logic state as opposed to detection of pulse positions. This enables a less rigid tolerance or accurate determination of the positions of the changing pulses and thus, a less rigid requirement of alignment of signal diagrams.

By comparing signal diagrams 80 and 82, it is apparent that there is only one occurrence during which the cam shaft signal 80 goes from a high position to a low position during the same time that the signature slot 28 passes magnetic sensor 36. Since the signature slot represents the upward stroke of cylinders one and four, and the transition between two poles represents a specific valve location, it is apparent that the onboard computer can determine which cylinder to fire when this transition occurs. Since the signature slot 28 has a 60° dimension, there does not necessarily have to be a specific point within the signature slot when the transition from high to low occurs. Accordingly, the tolerances and dimensions of the slots need not be extremely accurate, and the magnetic field intensities of the magnet need not be great. In addition, the onboard computer can determine when to start firing the cylinders within a maximum of one revolution of the crank shaft. Consequently, drain on the battery is substantially reduced over the prior art direct ignition systems. The system further enables accurate sensing of cam and crank shaft positions at zero speed and power up in the correct logic state, thus providing an added advantage over the prior art systems.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of providing engine position signals to an engine controller in an internal combustion engine comprising the steps of:

determining a cam shaft position by means of a first magnetic sensor;

sending a signal from the first magnetic sensor to the engine controller indicative of the cam shaft position;

determining a crank shaft position by means of a second magnetic sensor, said second magnetic sensor positioned adjacent an integral counter weight with the crank shaft, the counter weight including two separate groups of patterned marks detectable by the second magnetic sensor, wherein each group includes the same number of marks and all but one mark of one of the groups has substantially the same dimension, the one mark being a signature mark having a greater dimension than the remaining marks; and sending a signal from the second magnetic sensor to the engine controller indicative of the crank shaft position.

2. The method of claim 1 wherein the step of determining a cam shaft position includes positioning a magnet having a plurality of north poles and a plurality of south poles in an alternative arrangement at an end of the cam shaft and positioning the first magnetic sensor proximate the magnet such that the first magnetic sensor detects changes in poles as the cam shaft rotates.

3. The method of claim 2 wherein the step of positioning the magnet includes positioning the plurality of north and south poles in an arrangement such that at least two of the north poles and two of the south poles have different sized areas.

4. The method of claim 1 wherein the two groups of patterned marks are two groups of four grooves each.

5. The method of claim 1 wherein the step of determining crank shaft position includes determining engine speed by means of the rate at which the marks pass the second magnetic sensor.

6. The method of claim 1 further comprising the step of comparing the signals from the first and second magnetic sensors by the engine controller to determine a specific position of the cam shaft signal when the crank shaft signal indicates the signature mark is present to determine which cylinder of the engine is to be fired.

7. The method of claim 1 wherein the step of determining the cam shaft position includes positioning the first magnetic sensor in a thrust plate of a cylinder head of the engine.

8. A direct ignition system for an internal combustion engine comprising:

a crank shaft including a plurality of counter weights, at least one of said counter weights including two groups of patterned slots, each group including the same number of slots and all but one of the slots of one of the groups has substantially the same dimension, the one slot being a signature slot having a wider dimension than the remaining slots;

a first magnetic sensor positioned adjacent the at least one counter weight including the slots, said first magnetic sensor sending a signal indicative of the pattern of slots;

a cam shaft including a plurality of lobes for positioning predetermined valves of the engine;

a second magnetic sensor positioned relative to said cam shaft, said second magnetic sensor sending a signal indicative of the cam shaft position; and wherein the first magnetic sensor signal is received by an engine controller to determine engine speed and piston positions and said second magnetic sensor signal is received by the engine controller to determine compression and exhaustion of the cylinders.

9. The ignition system according to claim 8 wherein the cam shaft includes a magnet having a plurality of alternating north and south poles, said second magnetic sensor sending a signal indicative of the alternating poles as the cam shaft rotates.

10. The ignition system according to claim 9 wherein the magnet has alternating north and south poles such that at least two of the opposite poles and two of the identical poles have different sized areas.

11. The ignition system according to claim 8 wherein the at least one counter weight includes two sets of four slots each, said signature slot being a slot of one of the sets.

12. The ignition system according to claim 8 wherein the second magnetic sensor is incorporated as a thrust plate maintaining the cam shaft within a cylinder head of the engine.

13. The ignition system according to claim 8 wherein the engine controller is a computer, said computer comparing the signal from the first magnetic sensor with the signal from the second magnetic sensor to determine a specific position of the cam shaft signal when the crank shaft signal indicates the signature slot is present.

14. The ignition system according to claim 8 wherein the first and second magnetic sensors are hall effect switches, said first sensor including a magnet.

15. A direct ignition system for an internal combustion engine comprising:

a cam shaft having a first end and a second end, said cam shaft including means for positioning a plurality of valves;

a magnet rigidly connected to said first end of said cam shaft, said magnet including a series of only four alternating north and south poles, wherein an outer face of the magnet defines an area representation of the alternating north and south poles, said face being substantially perpendicular to the cam shaft, and wherein the area of the face of each of two adjacent north and south poles have substantially a first dimension and the area of the face of each of the other adjacent north and south poles have substantially a second dimension, said second dimension being larger than said first dimension; and a magnetic sensor positioned adjacent said first end, wherein said magnetic sensor detects changing polarity of the magnet as the cam shaft rotates to determine cam shaft position.

16. The ignition system according to claim 15 wherein the magnetic sensor is positioned within a thrust plate, said thrust plate positioned to hold said cam shaft in place.

17. The direct ignition system of claim 15 further comprising a crank shaft including an integral counter weight and a second magnetic sensor, said integral counter weight including a plurality of groups of slots, at least one slot of one group being a signature slot of a wider dimension than the remaining slots, said second magnetic sensor sensing the slots as the crank shaft rotates, wherein the slots are representative of piston positions and engine speed and wherein a signal from said second magnetic sensor is compared with a signal from said first magnetic sensor to determine when a first cylinder is to be fired during engine start-up.

18. A method of determining cam shaft position in an internal combustion engine comprising the steps of:

positioning a disc magnet at one end of the cam shaft such that the disc magnet has a series of only four alternating north and south poles, wherein an outer face of the magnet defines an area representation of the alternating north and south poles, said face being substantially perpendicular to the cam shaft, and wherein the area of the face of each of two adjacent north and south poles have substantially a first dimension and the area of the face of each of the other adjacent north and south poles have substantially a second dimension, said second dimension being larger than said first dimension; and positioning a magnetic sensor adjacent said magnet; and sending a signal from said magnetic sensor to an engine controller indicative of the changes in polarity of the magnet as the cam shaft rotates to determine cam shaft position.

19. The method according to claim 18 wherein the step of positioning a magnetic sensor includes positioning a magnetic sensor within a thrust plate of a cylinder head of said engine.

20. An apparatus for providing engine position signals for the cylinders of an internal combustion engine comprising:

a first magnetic sensor means for determining a cam shaft position, said first magnetic sensor means sending a signal to an engine controller indicative of the cam shaft position; and a second magnetic sensor means for determining a crank shaft position, said second magnetic sensor means sending a signal to the engine controller indicative of the crank shaft position, said second magnetic sensor means positioned adjacent an integral counterweight of said crank shaft, said integral counterweight including two groups of patterned slots detectable by the second magnetic sensor means, each group including the same number of slots and all but one of the slots of one of the groups has substantially the same dimension, the one slot being a signature slot having a greater dimension than the remaining slots.

21. A method of providing engine position signals to an engine controller in an internal combustion engine comprising the steps of:

determining a cam shaft position by means of a first magnetic sensor;

sending a signal from the first magnetic sensor to the engine controller indicative of the cam shaft position;

determining a crank shaft position by means of a second magnetic sensor, said second magnetic sensor positioned adjacent an integral counter weight with the crank shaft, the counter weight including two groups of grooves detectable by the second magnetic sensor, each group including at least four grooves, wherein one of the grooves of one of the groups is a signature groove having a greater dimension than the remaining grooves; and sending a signal from the second magnetic sensor to the engine controller indicative of the crank shaft position.

22. A method of providing engine position signals to an engine controller in an internal combustion engine comprising the steps of:

determining a cam shaft position by means of a first magnetic sensor;

sending a signal from the first magnetic sensor to the engine controller indicative of the cam shaft position;

determining a crank shaft position by means of a second magnetic sensor, said second magnetic sensor positioned adjacent an integral counter weight with the crank shaft, the counter weight including two separate groups of patterned marks detectable by the second magnetic sensor, wherein one of the marks is a signature mark having a greater dimension than the remaining marks;

sending a signal from the second magnetic sensor to the engine controller indicative of the crank shaft position; and comparing the signals from the first and second magnetic sensors by the engine controller to determine a specific position of the cam shaft signal when the crank shaft signal indicates the signature mark is present to determine which cylinder of the engine is to be fired.

* * * * *